US011279599B2

(12) United States Patent
Span

(10) Patent No.: US 11,279,599 B2
(45) Date of Patent: Mar. 22, 2022

(54) WINCH APPLIANCE FOR TOWING COMPACT LOADS, IN PARTICULAR LOGS

(71) Applicant: TAJFUN PLANINA PROIZVODNJA STROJEV D.O.O., Planina Pri Sevnici (SI)

(72) Inventor: Iztok Span, Ljubljana (SI)

(73) Assignee: TAJFUN PLANTNA PROIZVODNJA STROJEV D.O.O.

( * ) Notice: Subject to any disclaimer, the term of this patent is extended or adjusted under 35 U.S.C. 154(b) by 36 days.

(21) Appl. No.: 16/472,076

(22) PCT Filed: Jan. 4, 2018

(86) PCT No.: PCT/SI2018/000001
§ 371 (c)(1),
(2) Date: Jun. 20, 2019

(87) PCT Pub. No.: WO2018/132076
PCT Pub. Date: Jul. 19, 2018

(65) Prior Publication Data
US 2020/0010310 A1 Jan. 9, 2020

(30) Foreign Application Priority Data
Jan. 12, 2017 (SI) .................. P-201700014
Dec. 20, 2017 (SI) .................. P-201700339

(51) Int. Cl.
*B66D 1/00* (2006.01)
*A01G 23/00* (2006.01)
(Continued)

(52) U.S. Cl.
CPC ............ *B66D 1/00* (2013.01); *A01G 23/006* (2013.01); *B66D 1/505* (2013.01); *B66D 1/54* (2013.01); *B66D 1/60* (2013.01)

(58) Field of Classification Search
CPC . B66D 1/00; B66D 1/04; B66D 1/505; B66D 1/60; A01G 23/006; B66C 21/00; B66C 21/04
See application file for complete search history.

(56) References Cited

U.S. PATENT DOCUMENTS 3,359,919 A * 12/1967 Stewart .................... B64D 1/00
104/22
3,776,390 A * 12/1973 Junes ....................... B66C 1/36
212/122
8,820,718 B2 * 9/2014 Weidner ................... B66D 1/00
254/332

FOREIGN PATENT DOCUMENTS

DE   2756743 A1   6/1979
KR   101471867 B1  12/2014

OTHER PUBLICATIONS

International Search Report and Written Opinion dated Apr. 30, 2018 issued in PCT/SI2018/000001 (12 pages).

* cited by examiner

*Primary Examiner* — Sang K Kim
*Assistant Examiner* — Nathaniel L Adams
(74) *Attorney, Agent, or Firm* — Haynes and Boone, LLP; William B. Nash; Alexander Lutzky

(57) ABSTRACT

The present disclosure provides an appliance for towing compact loads (e.g., logs), and include an auxiliary winch provided in combination with a main winch on a tractor without the need for separate powering means or the need to transport said auxiliary winch to the area adjacent to the load (away from the main winch/tractor.) The appliance may be provided by upgrading an existing tractor winch by, for example, attaching the auxiliary winch to a casing of the main winch, or to the ground adjacent the tractor with the main winch. The auxiliary winch may be furnished with a
(Continued)

driving means powered by disposable powering means on the tractor that may include auxiliary pulley block(s) with an accompanying accessory to provide attachment thereof to the terrain, with each pulley block suitable for guiding an auxiliary cable in the area outside of the line between the main winch and the load.

6 Claims, 7 Drawing Sheets

(51) Int. Cl.
*B66D 1/50* (2006.01)
*B66D 1/54* (2006.01)
*B66D 1/60* (2006.01)

ately mounted onto a commonly used tractor, which is furnished at least with a three-point connecting mechanism as well as with a cardan shaft suitable for driving each operating accessories, and moreover also include an auxiliary winch, which is adapted for towing of a cable during decoiling thereof from the winding drum of said main winch.

WINCH APPLIANCE FOR TOWING COMPACT LOADS, IN PARTICULAR LOGS

CROSS REFERENCE TO RELATED APPLICATIONS

This application is a United States national phase application of co-pending international patent application number PCT/SI2018/000001, filed Jan. 4, 2018, which claims the benefit of Slovenia Patent Application No. P-201700014 filed Jan. 12, 2017, and Slovenia Patent Application No. P-201700339, filed Dec. 20, 2017, of which are hereby incorporated by reference in their entirety.

BACKGROUND

The present disclosure refers to a winch appliance for towing compact loads, e.g. either single logs or several together looped logs.

Winch appliances generally include a main winch, namely a classical forestry winch, which is in a detachably mounted onto a commonly used tractor, which is furnished at least with a three-point connecting mechanism as well as with a cardan shaft suitable for driving each operating accessories, and moreover also include an auxiliary winch, which is adapted for towing of a cable during decoiling thereof from the winding drum of said main winch.

The present disclosure is rest on a problem, how to conceive an appliance of the previously described art, which should be suitable for towing of compact loads, in particular logs, and in which operation of the auxiliary winch could be performed without an auxiliary autonomous driving means and in particular also by avoiding difficult transportation of the auxiliary winch to a place in the adjacency of each load and far away from the main winch and the tractor, wherein establishing of such appliance should be preferably possible on the basis of upgrading of each existing forestry winch.

DRAWINGS

Now the present disclosure will be described on the basis of two embodiments, which are presented in the attached drawings, in which.

DETAILED DESCRIPTION

Figure 1:
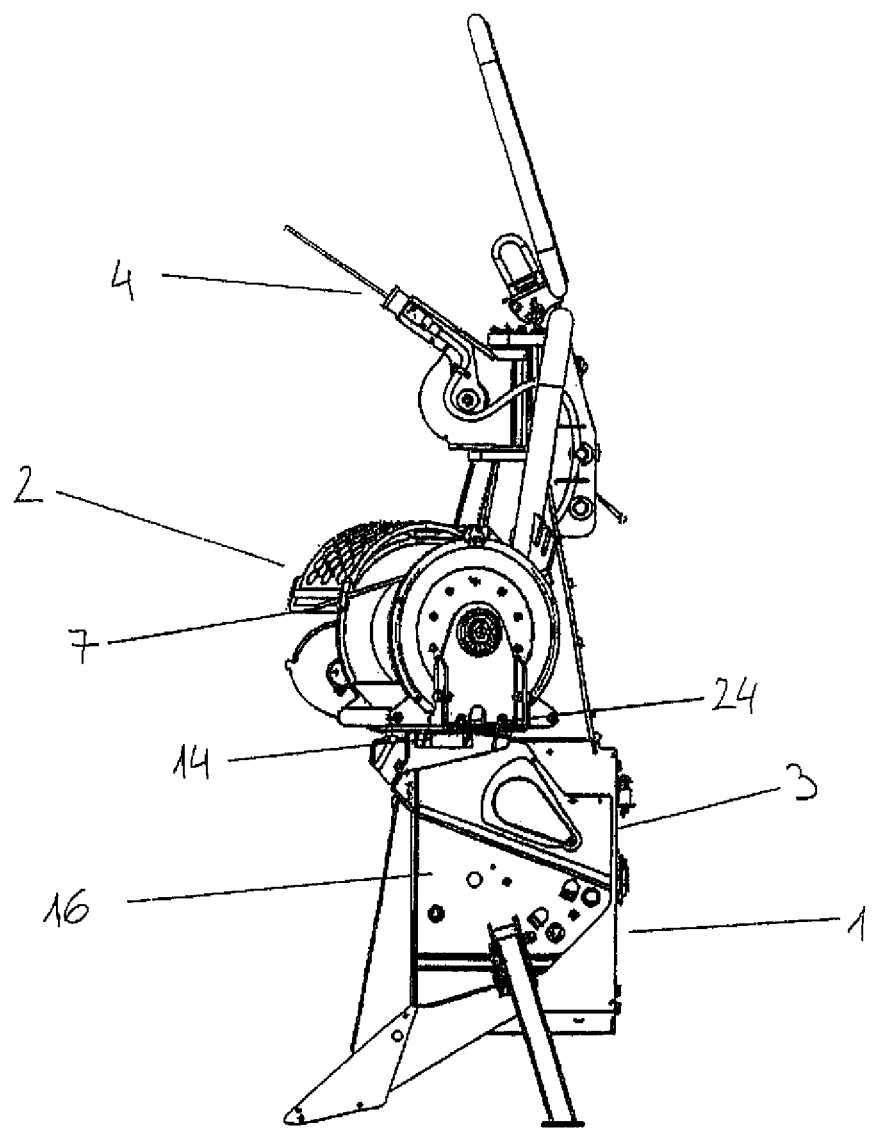
FIG. 1 is the first embodiment of the appliance according to the present disclosure, in which the auxiliary winch is attached to the casing of the main winch.

The present disclosure provides an appliance suitable for towing of compact loads, in particular logs, and in which operation of the auxiliary winch could be performed without an auxiliary autonomous driving means and in particular also by avoiding difficult transportation of the auxiliary winch to a place in the adjacency of each load and far away from the main winch and the tractor, wherein establishing of such appliance should be preferably possible on the basis of upgrading of each existing forestry winch. The appliance of the present disclosure comprises a main winch and an auxiliary winch, wherein both winches are powered by means of the same driving means, namely by means of the tractor, on which the main winch is mounted. In this, the main winch is intended for towing of each load by means of the main cable, while the auxiliary winch is intended for towing of said main cable during decoiling thereof from the winding drum of the main winch and therefore for transporting said main cable towards to each load prepared for towing. Towing of logs or trees therefore provides one of the applications of the appliance according to the present disclosure.

A forestry winch, which is suitable to be applied as a main winch in the appliance according to the present disclosure, is disclosed in SI 9600339 A2, to which the reference is made in this application. Such winch in fact represents an operating accessory which is mountable on a tractor and is then powered by means of a cardan shaft, with which said tractor is equipped and which otherwise serves also for driving of any other agricultural or forestry or industrial accessories. Such winch comprises a winding drum, which is by means of its normally horizontally arranged shaft rotatably embedded within a casing and is moreover furnished with a brake and a clutch, wherein said shaft is via appropriate transmission gear connectable with said tractor cardan shaft. A towing cable is wound on said winding drum, which can be either directly or indirectly via one or more pulley blocks extended towards each load prepared for towing. As soon as the load, e.g. a log or several mutually looped logs, is attached to said towing cable, and said winding drum is rotated in appropriate direction, the towing cable is wound onto said drum, by which the load is towed in a direction towards the winch. However, prior to such towing, said cable must be decoiled from the winding drum and the free end portion thereof must be extended to the load, by which the winding drum is either freely rotating, or is in certain cases even able to assist by delivering the cable in a direction oppositely to the towing direction. As soon as said free end portion of the towing cable is transported to the load, the load is properly attached to the towing cable. The force, with which the towing cable is decoiled from the winding drum, is in particularly in heavy duty winches furnished with correspondingly thick towing cable relatively high, which is consequence both of the weight and resilience of the cable, as well as of inertia and friction of the winding drum. Of that reason in the practice each decoiling of the cable from the winding drum and transporting thereof up to each load is a really hard and time consuming work.

In the context of the previously discussed problems, DE 2756743 A2 proposes introduction of an auxiliary winch. The proposed appliance comprises a main winch, which is mounted on a tractor and is also powered by means of said tractor, as well as an auxiliary winch, which should be located in the area, where also each load prepared for towing is located, namely at an essential distance apart from the tractor and the main winch, so that such auxiliary winch must be an autonomous assembly, which is furnished with its own driving engine and is generally able to operate independently on operation of said main winch and said tractor. By arranging each manipulating area said auxiliary winch is therefore transported to the area, in which each load is located, upon an auxiliary cable is decoiled from said auxiliary winch and extended towards the tractor with the main winch mounted thereon, wherein the driving means of the auxiliary winch is able to assist in rotation of the winding drum in the auxiliary winch and consequently in releasing of the auxiliary cable. Said auxiliary cable is essentially thinner and lighter than the main towing cable, and manipulating with the auxiliary cable is much easier and less dangerous as manipulation with the main towing cable.

As soon as the free end portion of said auxiliary cable is located in the adjacency of the main winch, the supplemental cable is attached to the main towing cable, which is then by means of said auxiliary winch extended towards the load. Upon that, the main towing cable is attached to the load, and by means of winding of the main towing cable onto the winding drum of the main winch said load is towed towards the main winch and the tractor. Both powering means, namely of the main winch and the auxiliary winch, can operate completely independently on each other, but are remote controlled, by which their operation is synchronized, which is required in order to assure a correct transportation of the main cable in one direction towards the load and upon that also a correct towing said load in the opposite direction i.e. towards the main winch. Such proposed solution no doubt makes easier said difficult and dangerous working operation related to decoiling and extension of the main cable towards the load, however for such purpose the auxiliary winch must unavoidably be furnished with an autonomous driving engine. Consequently, such auxiliary winch is heavy and difficult for manipulating. Besides, such auxiliary winch must be transported into adjacency of the load, which can due to configuration of a terrain be also very difficult, dangerous and time consuming, just like the transportation of the main towing rope towards the load.

In the view of the previous discussion, a correspondingly amended concept of such appliance for towing loads, in particular logs, would be therefore really helpful, since the use of said auxiliary winch should preferably not require any auxiliary powering means, and in particular also not any difficult transporting of said auxiliary winch to the area adjacent to the load and far away from the main winch and the tractor. And due to the fact that the majority of potential already possess a classical winch as well as a tractor which is need for operation thereof, it would be also very comfortable, if such appliance could be realized by means of upgrading each existing tractor winch.

The present disclosure proposes a winch appliance for towing compact loads, in particular logs, by means of a tractor winch, namely by means of a main winch, which in a detachable manner mounted on a tractor. Said tractor is furnished at least with a connecting mechanism for mounting of said main winch thereon, as well as with a cardan shaft, which is suitable for driving said main winch, and with a hydraulic circuit filled with hydraulic media and furnished with at least one hydraulic pump suitable for compressing said hydraulic media, Said main winch comprises a casing, in which a winding drum is mounted, which is able to rotate around its longitudinal geometric axis and on which a main towing cable is wound. Said winding drum is powered by means of a tractor driving unit via said cardan shaft on the tractor as well as via a suitable transmission gear, and is moreover furnished with alternatively operating brake and clutch. Moreover, said main winch is optionally controllable by means of a remote controller. In addition to said main winch, such winch appliance comprises also an auxiliary winch, which also comprises a casing, in which a winding drum is mounted, which is also rotatable around its longitudinal geometric axis and on which an auxiliary cable is wound. Said winding drum of said auxiliary winch is driven by means of a suitable driving means. The auxiliary winch is adapted for towing said main cable during decoiling thereof from the winding drum of the main winch and is like the main winch also optionally controllable by means of a remote controller.

The present disclosure proposes that such towing appliance, in addition to said main winch furnished with said towing cable and said auxiliary winch furnished with said auxiliary towing cable, also comprises at least one auxiliary pulley block, which is suitable for guiding of said auxiliary cable and is in each case in appropriate manner attachable to any disposable fixation point located outside of the line, in which the main towing cable extends between the main winch and each particular load. In this, said auxiliary winch is mountable either onto said casing of the main winch, or on the ground in the surrounding of the main winch and the tractor outside of the line, in which the main towing cable extends between the main winch and each particular load, so that a driving means of the auxiliary winch can be powered by means of one of the driving means, which are available on the tractor.

The winding drum of the auxiliary winch is embedded within the casing of the auxiliary winch and is rotatable around its longitudinal geometric axis, which extends at least approximately in a horizontal direction, wherein said casing of the auxiliary winch is on its base pivotable around the geometric axis, which extends at least approximately perpendicularly with respect to the previously mentioned axis of the drum and extends at least approximately in a vertical direction, and wherein said casing of the auxiliary winch can be upon each rotation thereof around said at least approximately vertical axis fixed in its position, by which any further pivoting thereof can be disabled.

In one of the embodiments of the present disclosure said driving means of the auxiliary winch is a hydraulic motor, which is hydraulically connected with at least one hydraulic circuit on the tractor, on which the main winch is mounted, and is via hydraulic conduits supplied by the hydraulic media from said at least one hydraulic circuit on each belonging tractor, on which said main winch is mounted.

Moreover, in one embodiment of the present disclosure, said auxiliary winch is furnished with a sensor, which is suitable for detecting each tightened or loose state of the auxiliary cable and is located at appropriate distance apart from the drum of said auxiliary winch onto/from which said auxiliary cable is coiled/uncoiled, wherein said sensor represents a part of a control system for controlling of operation of the auxiliary winch in the sense of switching on or switching off the winding drum of said auxiliary winch.

Said sensor is preferably adapted for indirectly monitoring of tension within the auxiliary cable on the basis of each position of a flap, which is pivotally embedded in the casing of the auxiliary winch and furnished with a recess, through which said auxiliary cable extends, such that each position of said flap depends on tension of said auxiliary cable in the area adjacent to the winding drum of the auxiliary winch. In one of the embodiments of the present disclosure said sensor is an inductive sensor.

Still further, the casing of the auxiliary winch is furnished with a base, which is suitable either for mechanical attachment, in particular screwing, of the auxiliary winch onto the casing of the main winch, or for anchoring of said auxiliary winch by means of appropriate anchors and anchoring cables onto each ground in the area adjacent to the tractor furnished with said main winch.

The present disclosure also proposes a kit for upgrading of an existing forestry winch for the purpose of establishing a winch appliance for towing loads, wherein said appliance includes previously described features. Said kit according to the present disclosure comprises at least an auxiliary winch with a casing, which is pivotal around its vertical axis and can be fixed in each desired position by means of appropriate fixation means, and which is also furnished with a base, which is suitable either for mounting directly onto a casing of each existing main winch or for anchoring onto each ground in the area adjacent to a tractor, on which said main winch is mounted, and which is furthermore furnished with an auxiliary winding drum with an auxiliary cable wound thereon, the free end portion of which is mechanically connectable with a free end portion of the towing cable of the main winch, wherein said auxiliary winding drum is rotatable in one or another direction by means of a driving means, which is powered by means of one of each disposable driving means on the tractor, on which the main winch is mounted.

Moreover, such kit is furnished with a sensor, which is suitable for detecting tension in the auxiliary cable and is located at appropriate distance apart from the drum of said auxiliary winch, wherein said sensor is for the purpose of communication connectable to a remote control system for controlling of operation of the main winch.

Optionally, such kit also comprises at least one auxiliary pulley block, which is optionally furnished with appropriate attaching facility suitable for attachment of said auxiliary pulley block to each disposable and suitable location on each terrain.

The appliance according to the present disclosure comprises a main winch with a main towing cable suitable for towing of each load, in particular logs, an auxiliary winch with an auxiliary cable, which is intended for towing of said main cable to the load, as well as at least one auxiliary pulley block, which is intended for guiding of said auxiliary cable. A pulley block, which is suitable for such purpose, is described in EP 2 911 972 B1, to which a reference is made. Such pulley block is by means of appropriate attaching means, e.g. a cable, strap, chain or the like, attachable to a suitable and reliable place in the natural environment, like e.g. to standing trees or the like.

The term "cable" in this application means a rope, namely a steel cable, strap or any other flexible means, which can be wound around the winding drum. The main towing cable must in particular be capable to withstand corresponding tensioning forces, to which is exposed by towing each load, while the auxiliary cable is capable to withstand essentially lower tensioning forces, which result from towing of the main cable, so that thickness and weight thereof can be essentially lower than thickness and weight of the main cable. Towing by means of auxiliary winch is namely intended exclusively for decoiling of the main cable from the main winch.

Both winches, namely the main winch and the auxiliary winch, are driven by means of the same powering means, which is available on a tractor or similar transporting device furnished with a powering means for driving a cardan shaft as well as with at last one hydraulic circuit for powering a three-point attaching mechanism, so that both the main winch and the auxiliary winch are powered by driving outputs on the tractor. The main winch can be powered via the cardan shaft of the tractor, and the auxiliary winch can be powered by auxiliary driving means like a hydraulic motor, which is via appropriate control block powered by means of the hydraulic media supplied from a hydraulic pump of the tractor. Modern tractors are usually equipped with several hydraulic outputs, to which various appliances can be connected, which are then powered by means of said hydraulic pump as available on the tractor.

The main winch comprises a main winding drum, on which a main towing cable is wound, as well as a main driving means. The first end portion of the main cable us attached on the main drum, while the other end portion thereof is adapted for establishing appropriate connection with each load, or also with the auxiliary towing cable. As known, there are several approaches in connecting of said main cable with each load, for example by means of a hook, in which a forestry chain is inserted, which is on the other hand attached to each load. The main winch is mounted on a tractor, which is by towing each load maintained in place. The main winch is attached to the tractor preferably by means of a detachable connection with a three-point attaching mechanism of the tractor. In general, the main winch can be attached to the tractor in various manners, and when the main winch is mounted on a tractor, the powering thereof may be performed by means of said cardan shaft of the tractor.

The main powering means and the main winch can operate in following modes:
  free running mode, in which the main powering means is operating and the brake is totally released, so that the main cable can be, when exposed to a sufficient force, decoiled from the main winding drum;
  towing mode, by which in which the main powering means is operating, and the winding drum is rotating in such direction that the main towing cable starts winding onto the main drum, upon which the main winch is promptly stopped by means of activating of the brake, as soon as the towing function is terminated and the cable gets tendency of decoiling due to the load;
  braking mode, wherein the main winding drum is deactivated, and rotation of the main drum in a direction of decoiling of the main cable from the main drum is prevented by means of the brake, so that the main cable cannot be released from the main drum.

This lastly described mode is used for preventing of any undesired movement of the load in a direction away from the main winch. In one of the embodiments of the present disclosure said mode is activated, if none of buttons on the controlling console is pressed.

The auxiliary winch is intended for towing the main cable towards the load. It comprises an auxiliary winding drum, on which an auxiliary cable is wound, as well as a corresponding auxiliary driving means suitable for coiling or decoiling of said auxiliary cable from said auxiliary winding drum or thereon. Said auxiliary driving means is preferably a hydraulic motor, which is arranged in the middle of the auxiliary winding drum. Said hydraulic motor is powered by means of a hydraulic pump on the tractor and via a control module of the auxiliary winding winch and corresponding hydraulic conduits.

Said auxiliary cable is with its first end portion attached to the auxiliary winding drum, while its second end portion is adapted for establishing a detachable connection with the free end portion of the main cable, or for establishing a detachable connection with each load, preferably a log. To this aim, said free end portion of the auxiliary cable can be furnished with a clamp in form of carbine.

The auxiliary drum shaft preferably extends horizontally, wherein said auxiliary cable is wound onto the winding drum in such way that its residual part is wound around the circumference of the auxiliary winding drum.

In one of the embodiments said auxiliary winch is furnished with a casing in form of a hollow cylinder. A part of its circumference is formed like a flap, which is at its upper area pivotally attached to the circumference of said casing, and on its lower area with a recess, through which the auxiliary cable extends. Said pivotal attachment of the flap is performed in known art, however preferably in a geometric axis, which extends at least approximately parallel to said auxiliary winding drum shaft. Besides, a sensor is foreseen within said casing of the auxiliary winch, which is arranged adjacent to the winding drum and is foreseen for monitoring each tension of the auxiliary cable. Said sensor is preferably inductive sensor, which is in one of possible embodiments of the present disclosure located in a stationary part of said casing and is able to detect, when said flap is closed and when open i.e. lifted. Said sensor is via corresponding switch connected with the control means of said auxiliary winch. In a preferred embodiment of the present disclosure, where the auxiliary driving means is a hydraulic motor, said switch is available as a control part of the valve on the hydraulic control block of the auxiliary winch between said hydraulic driving means and each corresponding hydraulic pump on the tractor.

Said auxiliary winch is able to operate in the following modes:
- free running mode, in which decoiling of the auxiliary cable from the auxiliary winding drum is performed with sufficient force, however without assistance of the auxiliary driving means;
- coiling of the auxiliary cable onto the auxiliary winding drum by means of the auxiliary driving means, whereas in such mode said sensor is inactive, so that operation of the auxiliary driving means is performed regardless to each position of said flap;
- decoiling of the auxiliary cable, wherein the winding drum of the auxiliary winch is rotating in opposition direction as by coiling of the auxiliary cable, wherein by switching-on decoiling of the auxiliary cable also said sensor is activated, which is able to detect, when said flap is open, upon which it switches-on the auxiliary driving means, which is performed until said sensor detects that said flap is closed, upon which the auxiliary driving means is stopped by means of said switch and operation in this mode is terminated.

Decoiling of the auxiliary cable is performed in situation, when each user intends to extend the auxiliary cable along each working area. As soon as the user starts to pull and tension the auxiliary cable, the flap is lifted, which is detected by said sensor, by which the auxiliary driving means is activated and decoiling of the auxiliary cable is performed. Consequently, decoiling of the auxiliary cable is simplified. However, when the uses stops during decoiling of the auxiliary cable, the tension therein drops and the cable becomes loose, upon which said flap is closed, which is detected by the sensor, upon which the auxiliary driving means is switched off. In such way each excessive decoiling of the auxiliary cable is excluded even in situation, when the user us located far away from the auxiliary winch and the tractor with the main winch. Said sensor and the auxiliary driving means are active exclusively in this operating mode.

The auxiliary winch is generally rotatable around its at least approximately vertical geometric axis and is mounted either onto the casing of the main winch or onto an autonomous base, which is suitable for anchoring on each ground by means of appropriate anchors and anchoring cables. When said auxiliary driving means is a hydraulic driving means, rotation of the casing of said auxiliary winch is limited and depends on length of hydraulic conduits. Thanks to said possibility of rotation, each position of the auxiliary winch can be optimally adjusted in each desired direction of decoiling of the auxiliary cable towards the closest auxiliary pulley block, which is intended for guiding of said auxiliary cable.

A person skilled in the art would understand, that in an embodiment of said winch appliance, in which the driving means of the auxiliary winch is a hydraulic motor, the distance between the auxiliary winch and the tractor with the main winch is limited by length of each hydraulic conduits, by means of which said hydraulic driving means is connected to each disposable hydraulic circuit on the tractor.

As soon as each orientation of the auxiliary winch is determined, any further rotation thereof around its vertical axis is disabled by means of any known arresting means, since its rotation of the auxiliary winch during its operation is not desired. The auxiliary winch can also be placed onto an auxiliary base, which can be attached e.g. on a tree. Said orientation of the auxiliary winch in each desired direction is preferably solved in the same manner like by mounting of the auxiliary winch onto the case of the casing of the main winch.

In one of the embodiments of the present disclosure, said arresting means is an axle with a thread, which is welded onto base of the auxiliary winch and extends through a bore in a beam, which is fixedly attached to the casing or an autonomous base, and is furnished with a nut, which is adapted for cooperation with said thread on the axle. When the nut is tightly screwed, rotation is disabled.

As mentioned, the appliance according to the present disclosure is furnished with at least one auxiliary pulley block, over which the auxiliary cable is directed from its starting point, namely from the auxiliary winch, towards the load. By using more than one auxiliary pulley block said auxiliary cable can be optimally extended along each working area. It is however desired that said auxiliary extends outside of the trajectory of towing the load and therefore outside of the line between the main winch and the load.

In one of possible embodiments, controlling of the appliance according to the present disclosure is performed by means of a control console, which is either by wires connected with the control system or is integrated in a remote controller, so that the user is able to activate each desired functions of the main winch and/or the auxiliary winch by simply pressing appropriate buttons.

Exploitation of the appliance according to the present disclosure in the sense of activating possible functions by powering the main winch and/or auxiliary winch as disclosed in the forthcoming explanation and includes the following steps:

a) by establishing each working area the route between the main winch and the load is determined, along which each load shall be transported, while at the same also each required locations for attachment of the auxiliary pulley block are defined, by which also the route of extension of the auxiliary cable is determined and by which it is recommended that said auxiliary cable should extend outside of the route of extension of the main towing cable, so that possible collisions between the auxiliary cable and the main cable as well as with the load is excluded;

b) thereafter, by pivoting the casing around its at least approximately vertical geometric axis it shall be adjusted in such a way that the auxiliary cable by decoiling from the drum is directed towards the closest auxiliary pulley block, upon which said pivoting around said axis is disabled by means of corresponding arresting means, since during operation of the auxiliary winch said pivoting is not desired;

c) in the next step said auxiliary cable is extended from the auxiliary winch via each disposable auxiliary pulley blocks towards the pulley block, which is located closest to the load, upon which the auxiliary cable is towed up to the main winch, by which decoiling of the auxiliary winch is enabled, since the auxiliary winch at that time operates in its freely running mode, or when desired, even in the mode of decoiling of the auxiliary cable from the auxiliary winch, by which upon the auxiliary cable is tensioned by the user, the flap is lifted, which is recognized by the sensor and the auxiliary driving means is activated by the switch in order to support decoiling of the auxiliary cable and make this operation much easier from the users point of view, and as soon as then the user stops during extending the auxiliary cable, the tension of the auxiliary cable is essentially reduced, and said flap is closed, which is also detected by the sensor, so that each user is capable to control said driving means of the auxiliary winch by means of tensioning or loosening the auxiliary cable and prevent excessive decoiling of the auxiliary cable, which could otherwise lead to formation of loops and related difficulties;

d) upon that, the free end portion of such extended and properly directed auxiliary cable is in a detachable manner connected to the free end portion of the main towing cable, which is in that time still almost entirely wound on the main winding drum;

e) during the next step the main towing cable is by means of the auxiliary cable and auxiliary winch decoiled from the main winding drum and towed towards the load, wherein on the one hand said main towing cable is decoiled from the main winding drum, and on the other hand the auxiliary cable is simultaneously wound onto the drum of the auxiliary winch, by which the main winding drum is operating in its freely running mode and decoiling of the main towing cable is enabled, and the auxiliary winch operates in the mode of coiling of the auxiliary cable onto the auxiliary drum, wherein the velocity of decoiling of the main towing cable from the main drum is determined by the velocity of rotation of the drum in the auxiliary winch, and as soon as the free end portion of the main towing cable reaches each desired position adjacent to the load, the auxiliary winch is switched off;

f) upon that the main towing cable is detachably connected to the load, e.g. by means of a forestry chain, while the auxiliary cable is also in a detachable manner, preferably also with a forestry chain, connected to the load, so that by towing the load towards the main winch and the tractor said auxiliary cable cannot collide with the load, which it then just follows;

g) thereafter, the load is towed towards the main winch, by which during said towing the main winch operates in its towing mode, namely in the mode of coiling the main towing cable onto the main winch, while the auxiliary winch at that time operates in its freely running mode, so that the auxiliary cable can be freely decoiled from the drum in the auxiliary winch;

h) if none of buttons on the control unit is pressed, then in the moment, when the towed load reaches a pre-determined location adjacent to the main winch, the main winch is automatically switched into its braked mode, upon which the free end portion of the main towing cable can be disconnected from the load;

i) whenever the user wishes to continue with towing of further loads on in same working area, then he may continue with performing the previously described step d), wherein he can use the mode of decoiling of the auxiliary cable in order to displace the auxiliary cable for the length of the load up to the end portion of the main towing cable.

An embodiment of an appliance according to the present disclosure, which is shown in FIG. 1, comprises a main winch 1 and an auxiliary winch 2. The main winch 1 is in the area of its casing 16 attached to a not shown three-point attaching mechanism on a tractor (also not shown) and comprises at least a winding drum 3, on which a main towing cable 4 is wound, as well as a corresponding main driving means, which includes a gearbox, a brake and a clutch and is mechanically connected with a cardan shaft of said tractor.

Figure 2:
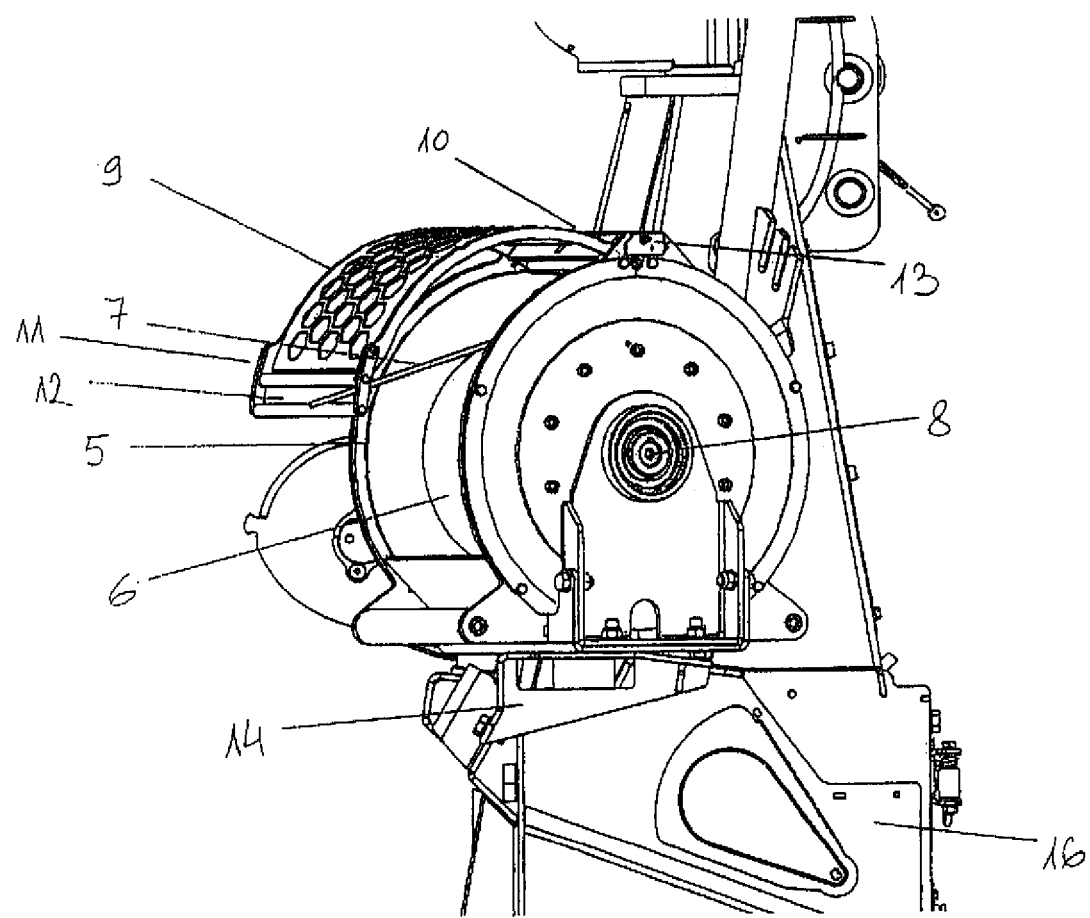
FIG. 2 is a separately shown auxiliary winch of the appliance according to FIG. 1, in an isometric view.
Figure 3:
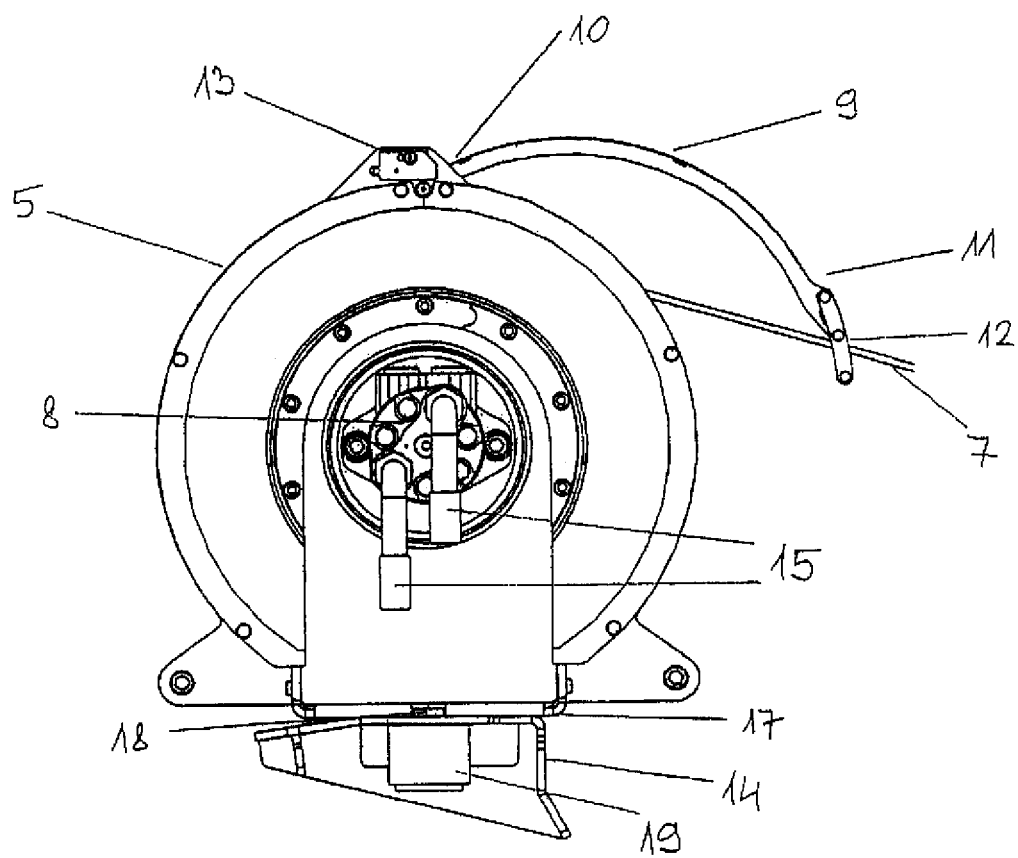
FIG. 3 is a separately shown auxiliary winch of the appliance according to FIG. 1, in a plan view.
Figure 4:
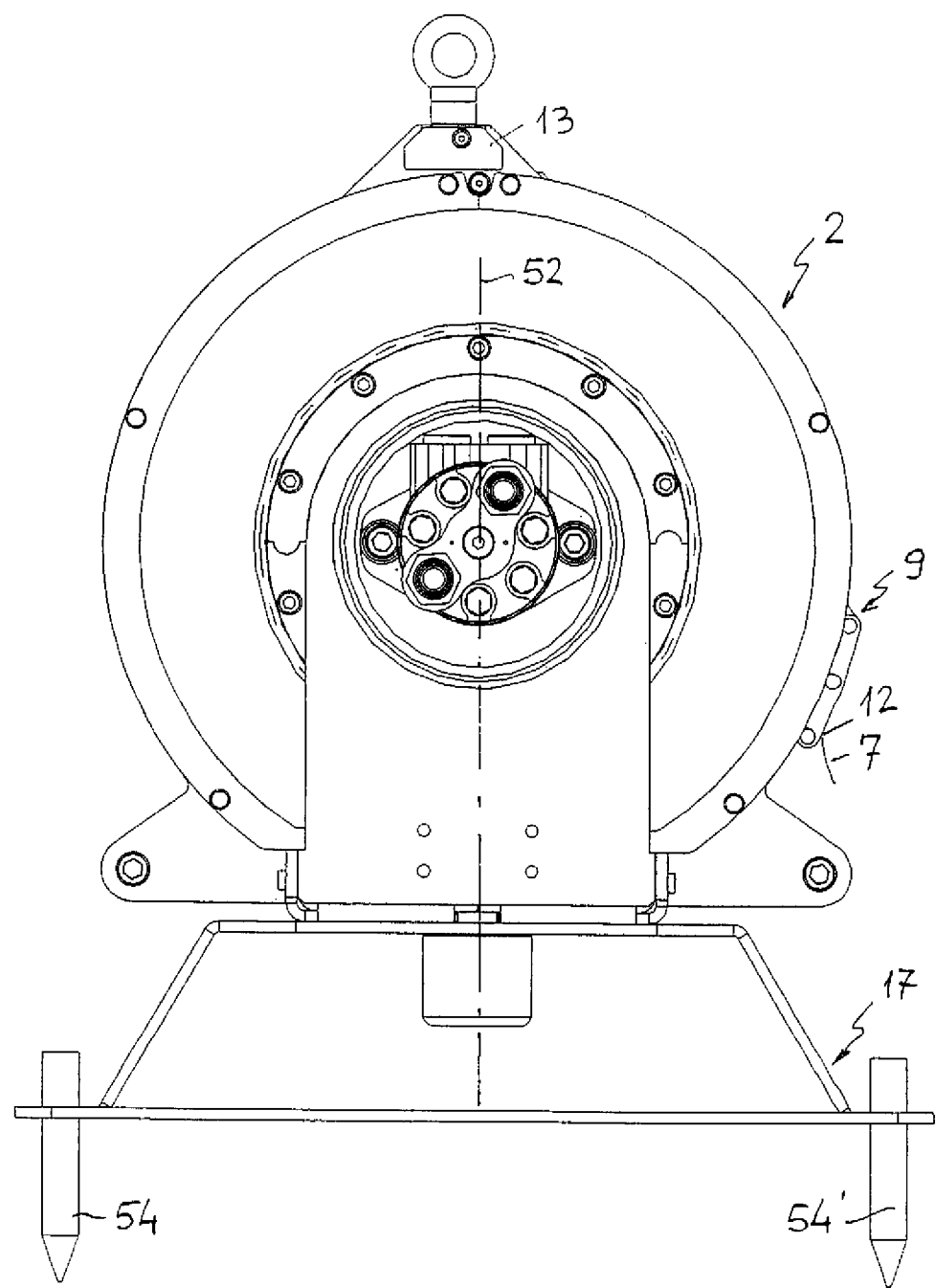
FIG. 4 is a separately shown auxiliary winch in the further embodiment of the appliance, where the auxiliary winch is anchored on the ground adjacent to the tractor with the main winch.
Figure 5:
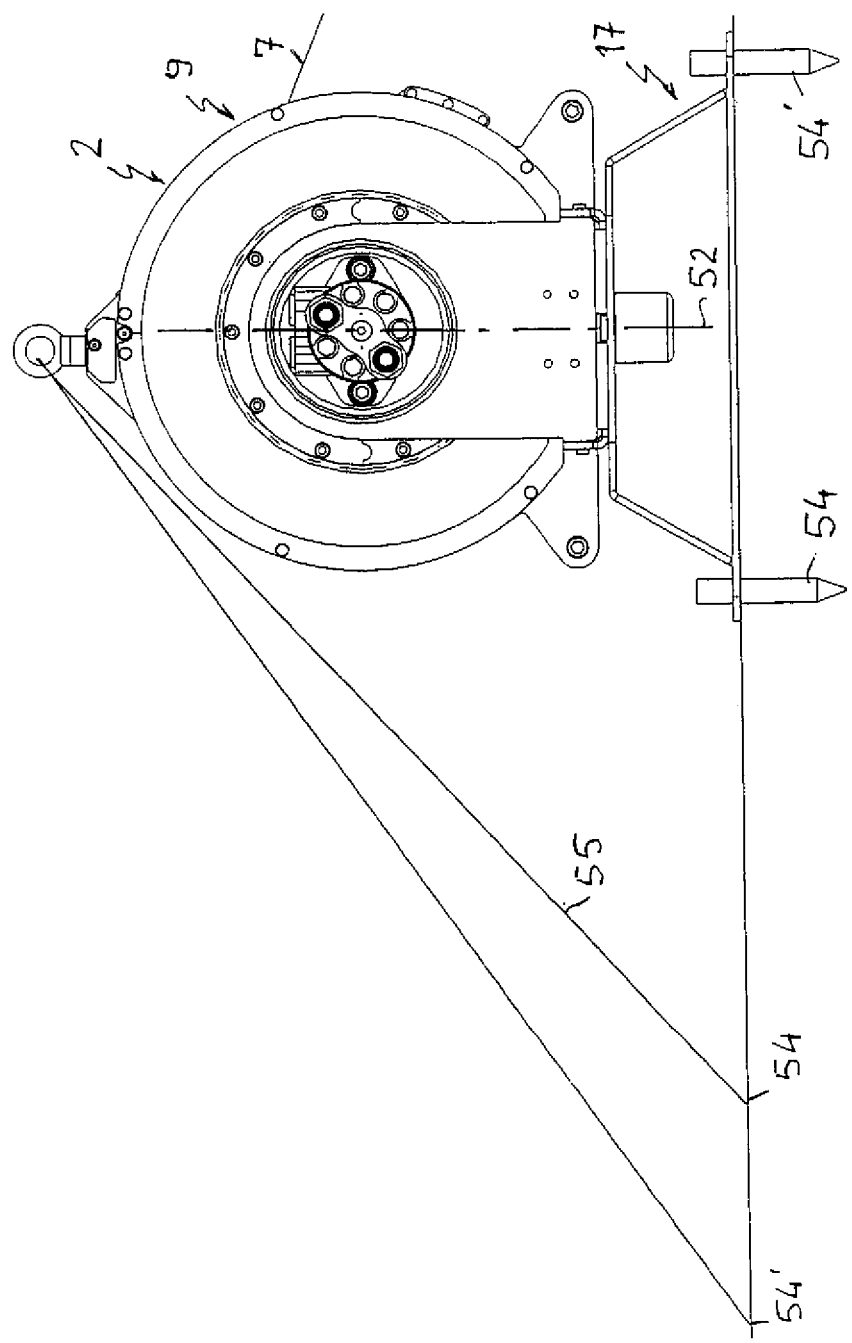
FIG. 5 is a separately shown auxiliary winch of the appliance according to FIG. 4, in a plan view.
Figure 6:
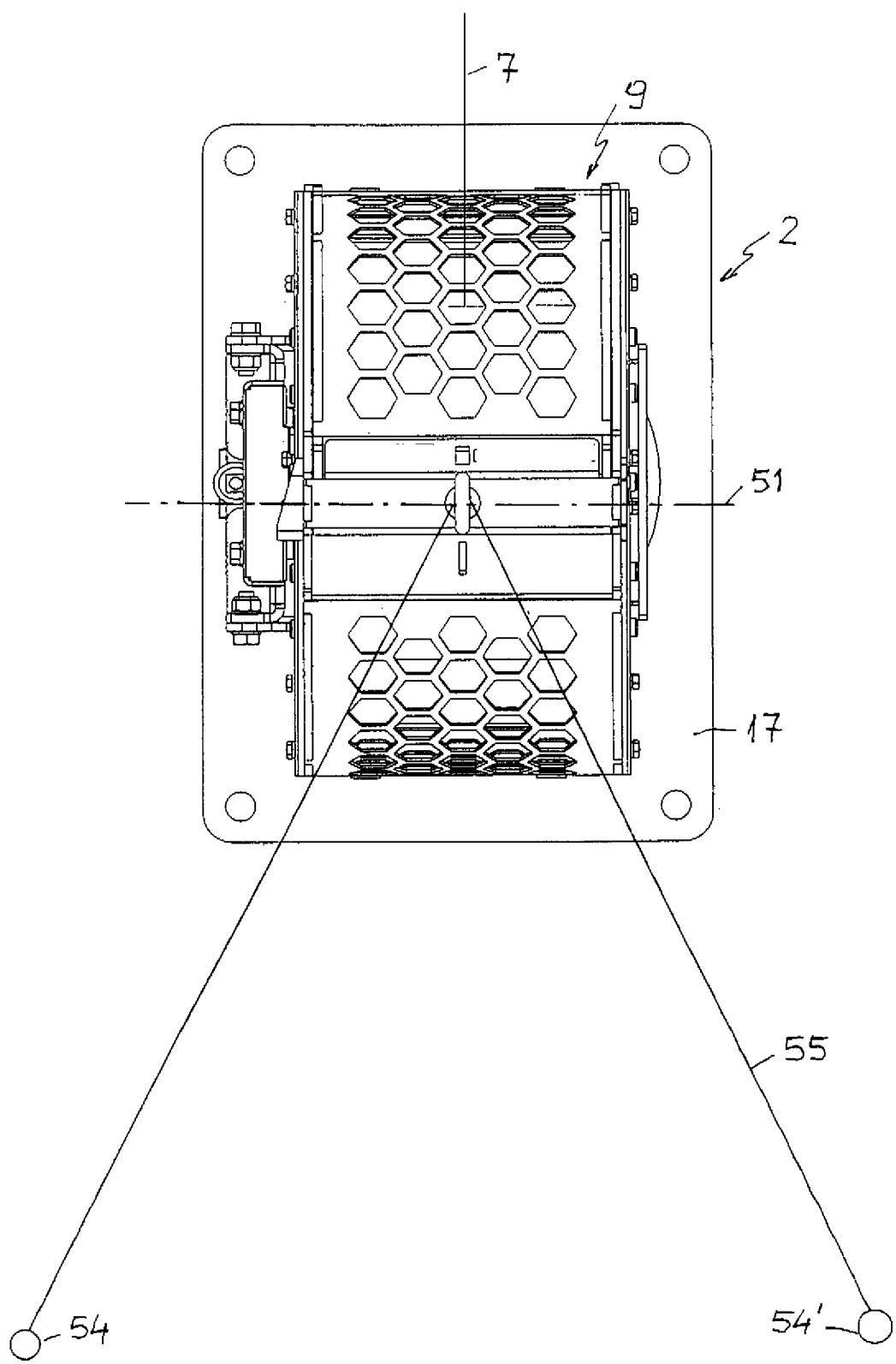
FIG. 6 is a separately shown auxiliary winch of the appliance according to FIG. 5, in bottom view.
Figure 7:
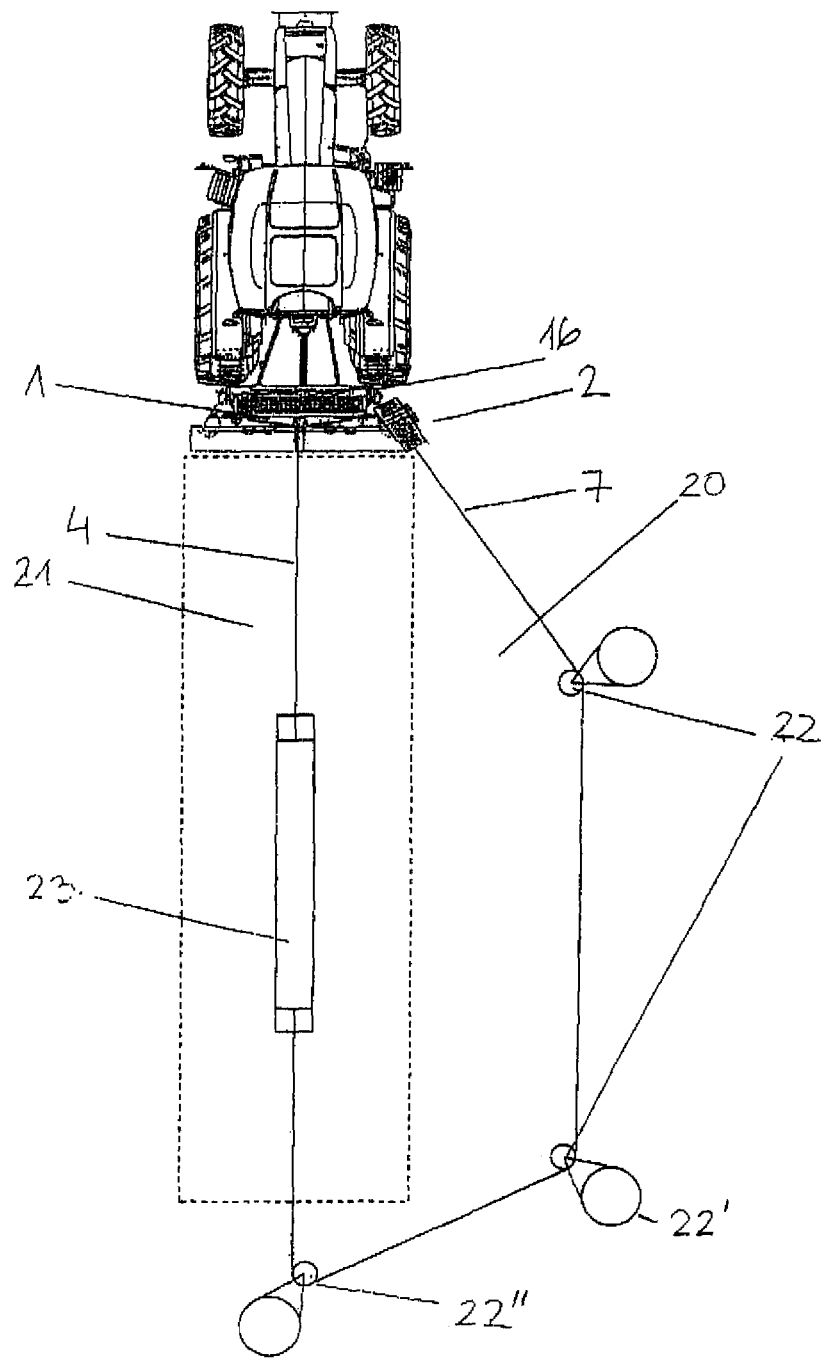
FIG. 7 presents an example of exploitation of the appliance related to the embodiment according to FIGS. 1-3.

Said auxiliary winch 2 is shown in FIGS. 2 and 2 and comprises a casing 5 with an auxiliary drum 6 with a shaft, which extends along essentially horizontal longitudinal geometric axis 51 and on which an auxiliary cable is wound. Said drum 6 is powered by means of corresponding auxiliary driving means 8 and is adapted for coiling and decoiling of an auxiliary cable 7 on/from said auxiliary drum 6. In this case said driving means 8 is a hydraulic motor, which is arranged within said auxiliary drum 6. Said hydraulic motor is powered by means a hydraulic pump on the tractor via appropriate control block of the auxiliary winch 2 and hydraulic conduits 15. Said casing 5 of the auxiliary winch 2 is formed as a hollow cylinder. In the shown embodiment, a flap 9 presents a part of the circumference of said casing 5, and is in its attaching area 10 pivotally mounted on the circumference of the casing 5, wherein said flap 9 is furnished with a recess 12, through which said auxiliary cable 7 extends. Said auxiliary winch 2 is furnished with a sensor 13, which is adapted for detecting, when said flap 9 is lifted or closed, and which is in the shown embodiment available as an inductive sensor. Said sensor is via appropriate switch connected with the driving means 8, namely with the hydraulic motor in this particular case. Said switch represents a controlling part of a hydraulic controlling block between the hydraulic motor as a driving means 8 and the hydraulic pump on the tractor. Said auxiliary winch is furnished with a base 17 and is attached onto said casing 16 of the main winch 1, namely to a removable working accessory on the tractor, wherein it is allowed to be pivoted around its at least approximately vertical axis 52 and upon that fixed in each desired position by means of arresting means 24. In order to assure such required pivoting around said axis 52, the auxiliary winch 2 is in this particular case furnished with an axle 18 with a thread and arranged in the area of a beam 14, which is furnished with a suitable opening for receiving said axle 18, wherein said beam 14 is fixedly screwed onto said casing 16. Therefore, said arresting means 24 is in this particular case available as said threaded axle 18, which is inserted into the opening in the beam 14, together with an accompanying nut 19, which matches said thread on the axle 18. As soon as the nut is tightly tensioned, each pivoting is disabled.

An embodiment of the appliance according to the present disclosure, in which the auxiliary winch 2 is mounted onto the main winch 1. By arranging each working area 20 each towing route 21 is determined, along which auxiliary pulley blocks 22, 22', 22" are arranged and fixed. The auxiliary cable 7 is by means of the auxiliary winch 2 extended from the auxiliary winch 2 via said auxiliary pulley blocks 22, 22', 22" towards the last auxiliary pulley block, which is located adjacent to the load 23, and then further to the main winch 1. The main winch 1 and the auxiliary winch 2 thanks to the casing 16 form a detachable tractor accessory. The auxiliary cable 7 is e.g. by means of a carbine detachably connected with the free end portion of the main towing cable 4. Said main towing cable 4 is by means of the auxiliary winch 2 decoiled from the main winding drum 3 on the main winch 1 in a direction from the tractor towards the load 23. During said decoiling of the main towing cable 4 from the main winding drum 3 the auxiliary cable 7 is simultaneously coiled onto the auxiliary drum 6. As soon as the free end portion of the main towing cable 4 reaches the load 23, the main towing cable 4 is connected with the load, while the auxiliary cable 7 is connected with the rear portion of the load 23 in order to avoid its collision with the load 23 during the towing towards the tractor. As soon as the main winch 1 starts towing the load towards the tractor, the main towing cable starts winding onto the main winding drum 3 of the main winch 1, while the auxiliary cable 7 is decoiled from the auxiliary winch 2. As soon as the load 23 reaches a pre-determined position adjacent to the tractor, said activities may be repeated by towing another load 23.

Using such appliance with auxiliary winch may lead to several benefits, namely:
- the auxiliary winch 2 is helpful by decoiling of the main towing cable 4 from the main winding drum 3 and towing thereof towards the load 23;
- said auxiliary winch 2 in combination with each disposable auxiliary pulley blocks 22, 22', 22" enables, that the auxiliary cable 7, which is in general approximately at least two times longer than the main towing cable 7, is town along any desired route, which may be easily accessible and moreover enables that the auxiliary cable 7 along the sequence between the auxiliary winch 2 and the closest auxiliary pulley block 22, 22', 22" essentially differs from the route of towing the load 23, so that both cables 4, 7 cannot collide with each other and/or with the load 23, which leads to essentially simplified and much more safe operation;
- such appliance provides for application of auxiliary pulley blocks 22, 22', 22", which are suitable for guiding of the auxiliary cable 7 and may be arranged in various directions and at various distances apart from the auxiliary winch 2, which by adjusting of appropriate orientation of the auxiliary winch 2 by pivoting thereof around its vertical axis 52 enables uniformly coiling of the auxiliary cable 7, by which concentrating of said cable 7 on just one of both end portions of the auxiliary winding drum 6 is prevented, by which a lifetime of the auxiliary cable is essentially extended, and consequently, also the width of the auxiliary winding drum 6 may be herewith increased, which leads to decreasing of each required power on the driving means 8 in the auxiliary winch 2, when the auxiliary cable 7 is wound on the auxiliary drum 6, since by winding the radius of force action is increasing and the power required in the auxiliary driving means 8 is by coiling of the auxiliary cable 7 increasing, which is the reason why said increasing of the width of the auxiliary winding drum 6 is really helpful, since—when observed in the radial direction thereof—said auxiliary cable 7 is in an essential extent wound along the width and not only along the height thereof; and
- in addition to that, such an appliance also enables powering of both driving means in the main winch 1 and the auxiliary winch 2 by means of the same working machine, in particular by means of a tractor, which leads to a conclusion that said auxiliary winch 2 can be relatively light and comfortable in view of its use.

What is claimed is:

1. A winch system for towing a compact load, comprising:
   a main winch detachably mounted on a tractor, which tractor is furnished at least with a connecting mechanism for mounting of said main winch thereon, a cardan shaft, which is capable of driving said main winch, and a hydraulic circuit filled with hydraulic media and having at least one hydraulic pump capable of displacing said hydraulic media, wherein said main winch comprises:
   a main casing in which a main winding drum is mounted, which main winding drum is rotatable around its main longitudinal geometric axis and on which a main towing cable is wound;
   a transmission gear capable of being driven by said cardan shaft and capable of rotating said main winding drum; and
   an alternatively operating brake and clutch;
   wherein said main winch is optionally controllable by a remote controller;
   an auxiliary winch, which comprises an auxiliary casing in which an auxiliary winding drum is mounted, which is also rotatable around its auxiliary longitudinal geometric axis and on which an auxiliary cable is wound, and a hydraulic motor, which is hydraulically connected with the hydraulic circuit, wherein said auxiliary winding drum is capable of being driven by the hydraulic motor, and wherein said auxiliary winch is adapted for towing said main towing cable during decoiling thereof from the main winding drum of the main winch and is optionally controllable by said remote controller; and
   at least one auxiliary pulley block, which is adapted to guide said auxiliary cable;
   wherein the main towing cable extends between the main winch and the load forming a line, the at least one auxiliary pulley block is fixed at a position not on the line, and the auxiliary winch is mountable either onto the main casing or at a position not on the line.

2. The winch system according to claim 1, wherein the auxiliary casing is pivotable around a second axis approximately perpendicular to the auxiliary longitudinal geometric axis, and wherein said auxiliary casing is capable of being locked into position to disable pivoting about the second axis.

3. The winch system according to claim 1, wherein the auxiliary winch further comprises a base mounted to the auxiliary casing at the second axis, which base is capable of mechanical attachment onto the main winch casing, or of anchoring by anchors and anchoring cables onto ground in the area adjacent to the tractor.

4. The winch system according to claim 1, further comprising a sensor which is adapted to detect a tightened or loose state of the auxiliary cable, wherein said sensor is capable of switching on or switching off the hydraulic motor based on the tightened or loose state.

5. The winch system according to claim 4, wherein said sensor is adapted for indirectly monitoring the tightened or loose state of the auxiliary cable on the basis of position of a flap, which is pivotally mounted in the auxiliary winch casing and furnished with a recess, through which said auxiliary cable extends, such that each position of said flap depends on tension of said auxiliary cable.

6. The winch system according to claim 4, wherein said sensor is an inductive sensor.

* * * * *